US010658757B2

(12) United States Patent
Jackson et al.

(10) Patent No.: US 10,658,757 B2
(45) Date of Patent: May 19, 2020

(54) SATELLITE GROUND TERMINAL UTILIZING FREQUENCY-SELECTIVE SURFACE SUBREFLECTOR

(71) Applicant: Hughes Network Systems, LLC, Germantown, MD (US)

(72) Inventors: Thomas Jackson, Germantown, MD (US); Peter Hou, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 167 days.

(21) Appl. No.: 15/610,447

(22) Filed: May 31, 2017

(65) Prior Publication Data
US 2017/0264020 A1  Sep. 14, 2017

Related U.S. Application Data

(63) Continuation-in-part of application No. 15/185,515, filed on Jun. 17, 2016.
(Continued)

(51) Int. Cl.
*H01Q 5/50* (2015.01)
*H01Q 19/13* (2006.01)
(Continued)

(52) U.S. Cl.
CPC ......... *H01Q 19/13* (2013.01); *H01Q 15/0013* (2013.01); *H01Q 19/17* (2013.01);
(Continued)

(58) Field of Classification Search
CPC .... H01Q 5/50; H01Q 15/0033; H01Q 15/002; H01Q 5/314; H01Q 19/19; H01Q 19/13;
(Continued)

(56) References Cited

U.S. PATENT DOCUMENTS 4,342,036 A * 7/1982 Scott ................ H01Q 5/45
343/836
5,373,302 A   12/1994 Wu
(Continued)

FOREIGN PATENT DOCUMENTS

| EP | 0689264 | 12/1995 |
| EP | 1083626 | 3/2001 |
| WO | 2002073740 | 9/2002 |

OTHER PUBLICATIONS

International Search Report and Written Opinion for PCT/US2018/034960, dated Aug. 14, 2018, 15 pages.
(Continued)

*Primary Examiner* — Graham P Smith
*Assistant Examiner* — Jae K Kim
(74) *Attorney, Agent, or Firm* — Sheppard, Mullin, Richter & Hampton LLP

(57) ABSTRACT

A device and method are described for duplex satellite communication over a single satellite antenna. A satellite ground terminal may utilize a frequency-selective surface module including a frequency-selective surface as a subreflector acting as a frequency diplexer to separate signals received and/or transmitted by a first feed and a second feed of a satellite ground terminal, where each feed has a separate antenna horn. The frequency-selective surface module may be used in combination with a second subreflector such that a first feed and a second feed of the satellite ground terminal are implemented on the same side of the frequency-selective surface module.

8 Claims, 8 Drawing Sheets

Related U.S. Application Data

(60) Provisional application No. 62/182,380, filed on Jun. 19, 2015.

(51) Int. Cl.

| | | |
|---|---|---|
| *H04B 7/185* | (2006.01) | |
| *H04B 1/00* | (2006.01) | |
| *H01Q 19/19* | (2006.01) | |
| *H01Q 15/00* | (2006.01) | |
| *H01Q 19/17* | (2006.01) | |

(52) U.S. Cl.
CPC ............ *H01Q 19/19* (2013.01); *H01Q 19/191* (2013.01); *H04B 1/0057* (2013.01); *H04B 7/18513* (2013.01); *H04B 7/18517* (2013.01); *H04B 7/18528* (2013.01)

(58) Field of Classification Search
CPC ................ H01Q 1/247; H04B 7/18528; H04B 7/18517; H04B 7/18513; H04B 1/0057
See application file for complete search history.

(56) References Cited

U.S. PATENT DOCUMENTS

| | | | |
|---|---|---|---|
| 6,545,645 B1* | 4/2003 | Wu | H01Q 19/104 |
| | | | 343/781 CA |
| 2003/0163821 A1* | 8/2003 | Knutson | H04B 7/18517 |
| | | | 725/63 |
| 2003/0234745 A1 | 12/2003 | Choung et al. | |
| 2007/0109212 A1* | 5/2007 | Wu | H01Q 19/19 |
| | | | 343/781 CA |
| 2008/0062056 A1* | 3/2008 | Hoferer | H01P 1/161 |
| | | | 343/776 |
| 2015/0200701 A1 | 7/2015 | Stave | |
| 2015/0215011 A1* | 7/2015 | Hartenstein | H04B 7/02 |
| | | | 375/267 |
| 2016/0372838 A1 | 12/2016 | Jackson | |

OTHER PUBLICATIONS

International Search Report and Written Opinion for PCTUS2016038188, dated Sep. 20, 2016, 13 pages.

Derneryd A et al: "Dichroic Antenna Reflector for Space Applications", Ericsson Review (Incl. On), Telefonaktiebolaget, vol. 68, No. 2, Jan. 1, 1991, pp. 22-33.

* cited by examiner

SATELLITE GROUND TERMINAL UTILIZING FREQUENCY-SELECTIVE SURFACE SUBREFLECTOR

CROSS-REFERENCE TO RELATED APPLICATIONS

This application is a continuation-in-part of U.S. patent application Ser. No. 15/185,515, filed Jun. 17, 2016 and issued as U.S. Pat. No. 10,559,888 on Feb. 11, 2020, which claims priority to U.S. Provisional Patent Application 62/182,380, filed Jun. 19, 2015.

TECHNICAL FIELD

The disclosed technology relates generally to satellite ground terminals, and more particularly, some embodiments relate to satellite ground terminals utilizing a frequency-selective surface module as a frequency diplexer.

DESCRIPTION OF THE RELATED ART

Satellite ground terminals, such as the very small aperture terminal (VSAT), enable duplex communication within a communication network via a single reflector antenna system. The data signal transmitted from the VSAT to the satellite is called the uplink signal, and the data signal received by the VSAT from the satellite is called the downlink signal. Traditionally, the VSAT 100 is feed fed, meaning that a transceiver module 102 with a feed horn antenna located at the focal point of the reflector dish 104 of the VSAT 100 radiates the reflector dish, as illustrated in FIG. 1. The reflector dish 104 focuses the downlink signal 106 from the satellite to the feed horn of the transceiver module 102. For the uplink signal 108, the reflector dish transforms a spherical uplink signal radiated by the feed horn antenna of the transceiver module into a planar uplink signal for transmission to the satellite.

A single feed horn antenna is configured to receive and transmit both uplink and downlink signals over a particular band of frequencies, such as $K_a$ band, $K_u$ band, C, or other frequency bands. The design of the feed horn antenna must account for the differences between the uplink communication path and the downlink communication path. A balance must be struck between the gain requirements of the downlink path and the specific envelope standards for the uplink signal dictated by governmental regulations, such as those promulgated by the FCC.

It is necessary to separate the uplink signal from the downlink signal conveyed by the feed horn antenna. In order to separate the two signals, several waveguide devices are attached to the feed horn antenna. Each signal travels at slightly different frequencies within a specific frequency band. For example, some satellite communication occurs over the 30/20 GHz band, with the uplink signal at 30 GHz and the downlink signal at 20 GHz. The waveguide components act to separate the signals and transfer each separate signal to the correct processing circuitry for each communication path. Such separation is necessary to protect the low-power downlink side components from the high-power uplink signal.

The waveguide components are machined from metals, such as copper, aluminum, brass, and zinc, adding extra weight to the system that must be supported by the mast of the VSAT. In addition, it is expensive to machine the different waveguide devices, such as the orthomode transducer, due to the high precision necessary to achieve operational requirements.

BRIEF SUMMARY OF EMBODIMENTS

According to various embodiments of the disclosed technology, a system and method are provided for conducting duplex satellite communication using a single satellite antenna without the need for expensive and heavy waveguide devices attached to the antenna. A frequency-selective surface module including a frequency-selective surface placed within the optical path between the reflector and the focal point of the reflector acts may act as a frequency diplexer to separate two signals in different frequency bands (e.g., separate the uplink signal from the downlink signal). In addition, by separating the two signals earlier in the optical path, the components of the transmit communication path and the receive communication path may be independently located within the VSAT. This enables optimization of the feed horn antenna and other components connected to each separate communication path, eliminating the need to trade-off between efficiency and isolation as required when both communication paths are co-located.

In some embodiments, the frequency-selective surface module may be used in combination with a second subreflector such that a first feed and a second feed of the satellite ground terminal (e.g., a transmitter and receiver) are implemented on the same side of the frequency-selective surface module. In such implementations, the first feed and second feed may be integrated into the same unit.

In one embodiment, a communication terminal for satellite communications may include a main reflector, a first subreflector having a reflected focus, a second subreflector having a reflected focus, a first feed located at a reflected focus of the first subreflector, and a second feed located at a reflected focus of the second subreflector. In this embodiment, the first subreflector is a frequency-selective subreflector that is transparent to signals transmitted on a first band of frequencies and reflective to signals transmitted on a second band of frequencies; the second subreflector is reflective to signals transmitted on the first band of frequencies; the first feed transmits or receives signals on the second band of frequencies; and the second feed transmits or receives signals on the first band of frequencies. The communication terminal, in implementations, may be a very small aperture terminal (VSAT). The main reflector may be a prime focus dish or an offset dish. In implementations, one of the first band of frequencies and the second band of frequencies includes a Q-band of frequencies; and one of the first band of frequencies and the second band of frequencies includes a K-band of frequencies and a Ku-band of frequencies.

In implementations, the first subreflector and the second subreflector are not parallel. In implementations, at least one of the first feed and the second feed includes a transceiver. A receiver band selector switch may be coupled to the first feed and the second feed. In some implementations, the first feed and the second feed may be physically integrated into one unit. In one implementation, the second subreflector is a solid metal reflector that is reflective to signals transmitted on the first band of frequencies and the second band of frequencies.

In another embodiment, a method includes the steps of: transmitting a first signal from a main reflector of a satellite terminal to a first subreflector located within an optical path between the main reflector and a prime focus of the main reflector; passing the first signal through the first subreflector to a second subreflector, where the first signal is within a first band of frequencies and where the first subreflector is transparent to signals transmitted on the first band of frequencies; and reflecting the first signal at the second subreflector such that a first feed located at a reflected focus of the second subreflector receives the second signal. In an implementation, the method may further include the steps of: transmitting a second signal from the main reflector to the first subreflector, where the second signal is within a second band of frequencies; and reflecting the second signal at the first subreflector such that a second feed located at a reflected focus of the first subreflector receives the second signal.

In implementations, the first feed is a Q-band low-noise block receiver and the second feed is a K-band and Ka-band transceiver. Alternatively, the first feed may be a K-band and Ka-band transceiver and the second feed may be a Q-band low-noise block receiver.

In implementations, the first feed and the second feed are communicatively coupled to a receiver band selector switch, and the method further includes the step of the receiver band selector switch switching between the first band of frequencies and the second band of frequencies.

In another embodiment, a method includes: transmitting a first signal from a first feed to a first subreflector, where the first signal passes through a second subreflector before arriving at the first subreflector, where the first signal is within a first band of frequencies, where the first subreflector is reflective to signals transmitted on the first band of frequencies, and where the second subreflector is transparent to signals transmitted on the first band of frequencies; and reflecting the first signal at the first subreflector to a main reflector of a satellite terminal, where the first signal passes through the second subreflector before arriving at the main reflector. In a further implementation, the method may include the steps of: transmitting a second signal from the main reflector to the second subreflector, where the second signal is within a second band of frequencies, where the second subreflector is reflective to signals transmitted on the second band of frequencies; and reflecting the second signal at the second subreflector such that a second feed located at a reflected focus of the second subreflector receives the second signal.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION OF THE EMBODIMENTS

Embodiments of the technology disclosed herein are directed toward a device and method for duplex satellite communication over a single satellite antenna. More particularly, various embodiments of the technology disclosed herein relate to a satellite ground terminal utilizing a frequency-selective surface module including a frequency-selective surface as a subreflector acting as a frequency diplexer to separate signals received and/or transmitted by a first feed and a second feed of a satellite ground terminal, where each feed has a separate antenna horn.

In some implementations, the frequency-selective surface module may be used in combination with a second subreflector such that a first feed and a second feed of the satellite ground terminal are implemented on the same side of the frequency-selective surface module. In such implementations, the first feed and second feed may be integrated into the same unit.

Figure 1:
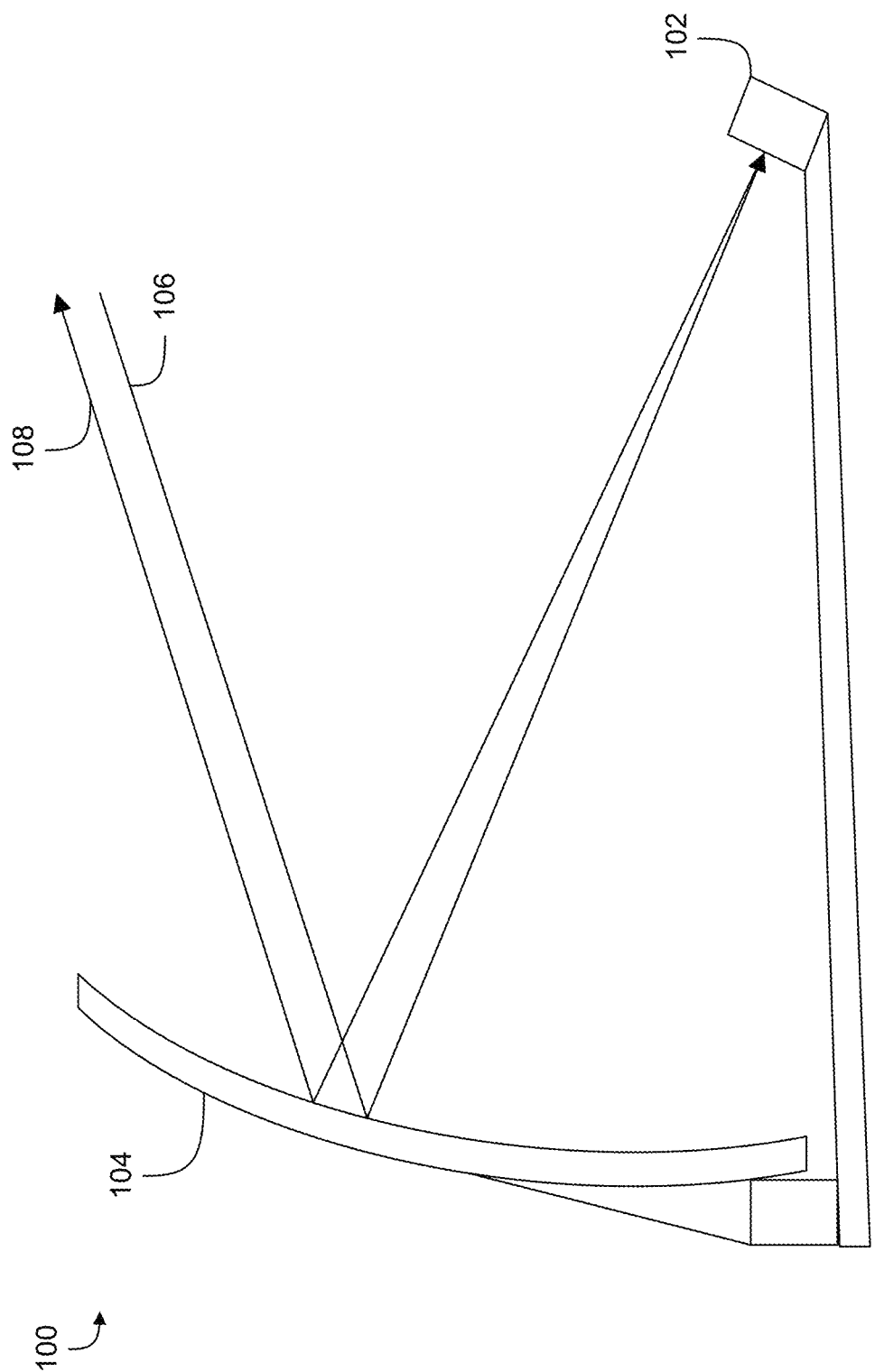
FIG. 1 illustrates an example of a traditional satellite communication terminal.
Figure 2:
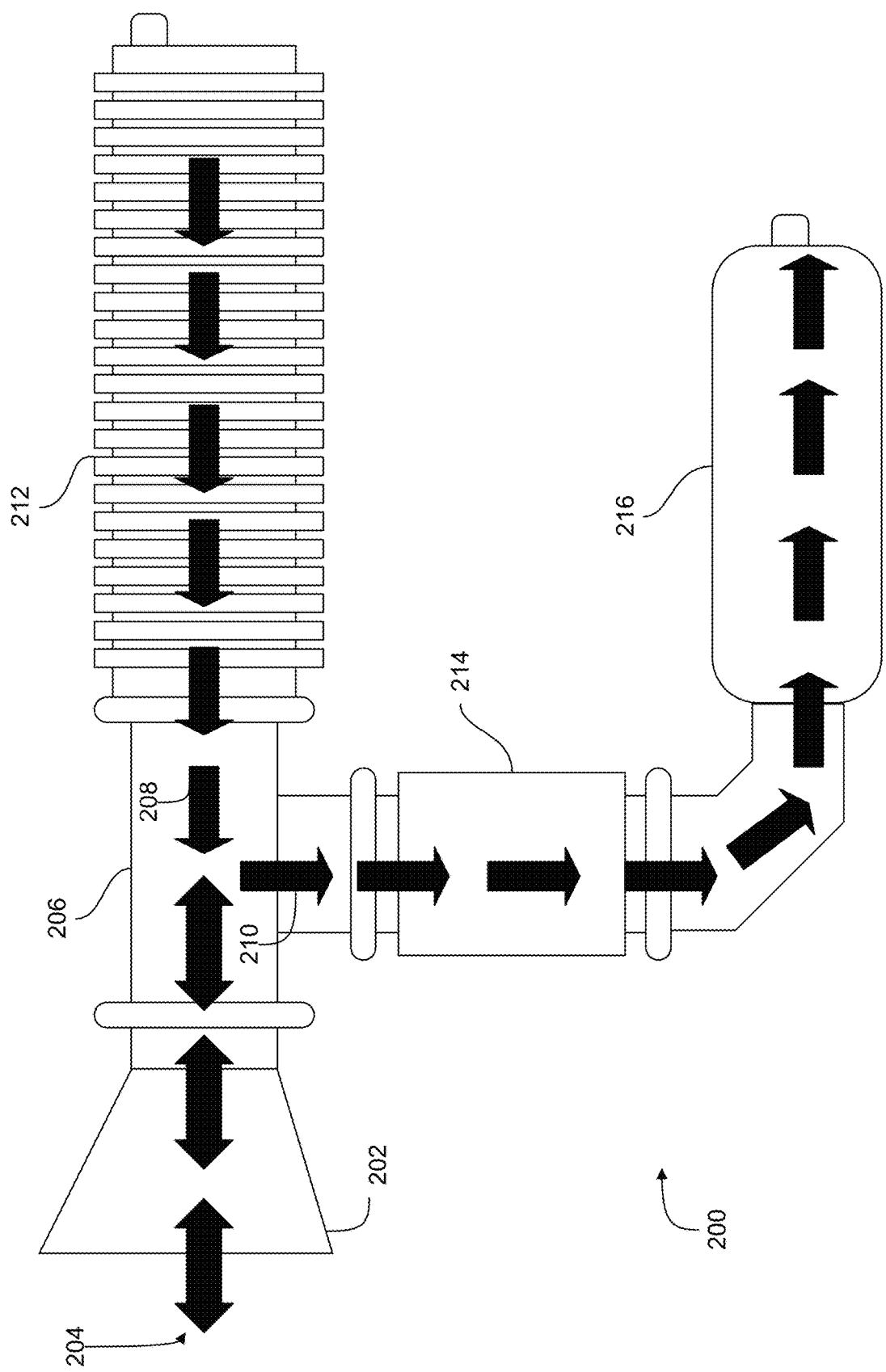
FIG. 2 illustrates an example outdoor unit, and the components thereof, traditionally used in separating the uplink signal and the downlink signal.

As discussed above, it is desirable that the VSAT 100 be able to provide a certain degree of separation between the uplink signal and the downlink signal to avoid an unacceptable level of crosstalk interference and to avoid damage to sensitive receiver components. FIG. 2 illustrates a traditional transceiver module 200 used to separate the uplink and downlink signals in a VSAT, such as the VSAT 100 shown in FIG. 1. Generally, the components of transceiver module 200 is referred to as the outdoor unit (ODU) of the VSAT. A feed horn antenna 202 is positioned at the focal point of a reflector dish and conveys both the uplink signal and the downlink signal over a data signal 204. Attached to the feed horn antenna 202 is an orthomode transducer (OMT) 206. The OMT 206 serves to combine or separate the uplink signal 208 and the downlink signal 210. When implemented in a VSAT, the OMT 206 orthogonally polarizes an uplink signal 208 and downlink signal 210 such that the two signals are at 90° to each other. Orthogonally polarizing the signals allows for greater isolation and decreased interference between the signals. The OMT 206 directs the downlink signal 210 to the downlink signal path.

The uplink signal 208 enters the OMT 206 from a block-up converter (BUC) 212. The BUC 212 converts signals received from a subscriber's indoor unit (IDU) from a lower frequency to a higher frequency. The BUC 212 converts the signal such that it falls within one of the radio spectrum bands identified for satellite communication, such as the $K_u$ band, $K_a$ band, C band, or other radio frequency band.

From the OMT 206, the downlink signal 210 enters a low-noise block (LNB) 216. The LNB 216 combines several different components, such as a low-noise amplifier, local oscillator, and frequency mixer, to convert the downlink signal into a range of intermediate frequencies (IF) for carrying the received signal from the VSAT to the IDU using coaxial cable or other inexpensive connector. In addition to the LNB 216, the downlink path may include additional waveguide elements, such as frequency filter 214.

As discussed above, the traditional ODU components are machined from metals, such as copper, aluminum, brass, and zinc. Each additional component adds weight to the VSAT, which should be taken into consideration in designing the overall VSAT. Machining of the ODU components is also expensive. Precise machining is desired for each waveguide component to meet the operational requirements of the VSAT, based on the material, operating frequencies, and filtering needs.

Further, use of a single feed horn antenna requires design trade-offs between the uplink signal and the downlink signal. For the downlink signal, a higher gain results in greater efficiency in the downlink communication path. For the uplink signal, regulatory rules govern how the uplink signal must operate within the communication band. When using a single feed horn antenna, a trade-off may occasionally be made to sacrifice higher gain to ensure that the uplink signal meets the mandated specifications of the communication band, as outlined by regulatory bodies like the FCC. Separating the components of the two signal paths increases the ability to optimize each signal path individually. Further, such separation also provides complete physical isolation of the two signal paths. This isolation may reduce potential interference between the transmit and receive signals on the different signal paths.

Figure 3:
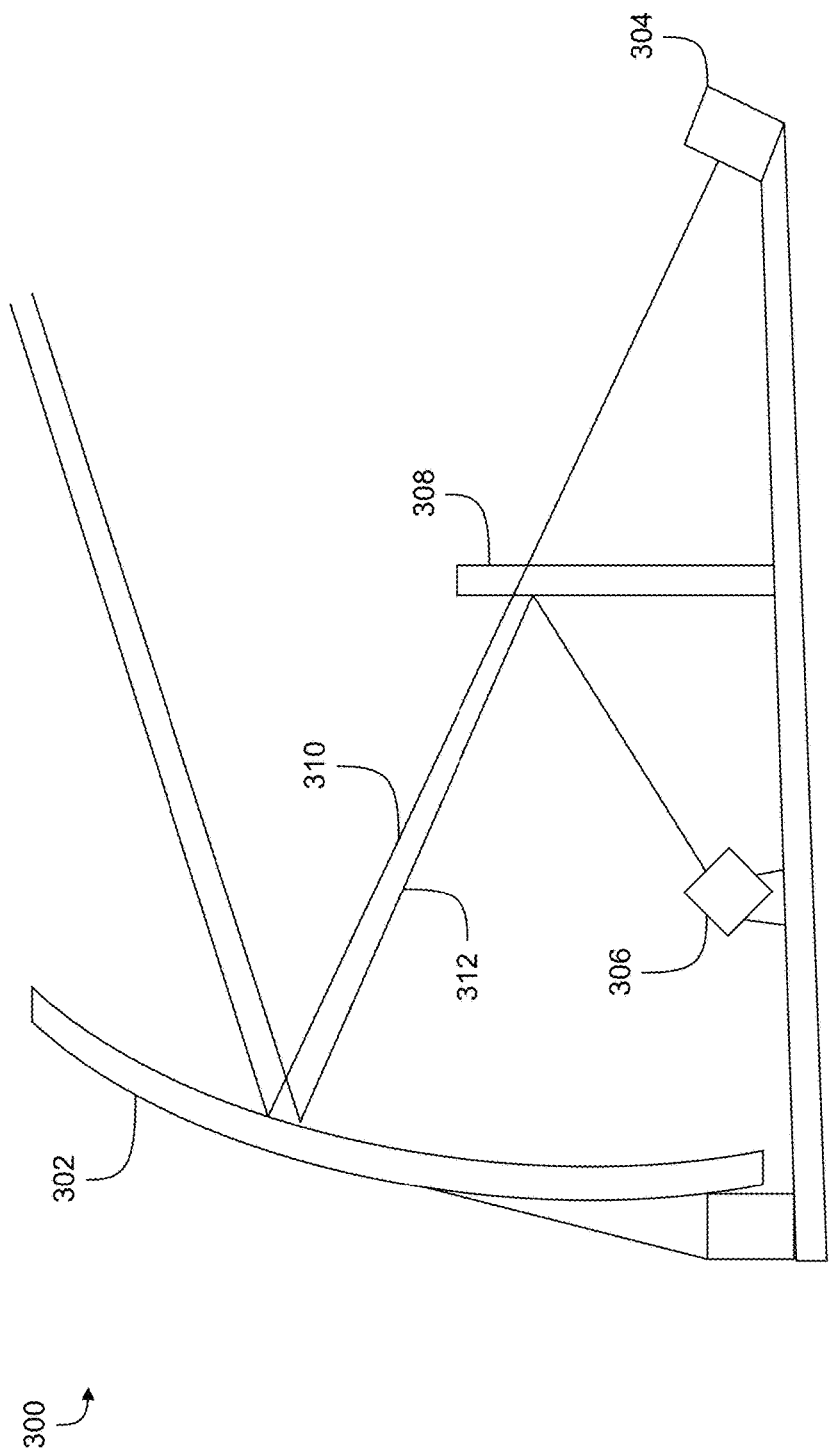
FIG. 3 illustrates a satellite ground terminal utilizing a frequency-selective surface module in accordance with one embodiment of the technology herein disclosed.

To avoid the need for multiple waveguide devices attached to the VSAT and to allow greater optimization of each communication path independently, a frequency-selective subreflector can be used to separate the uplink signal and the downlink signal. FIG. 3 illustrates an example VSAT 300 implementing a frequency-selective surface module in accordance with the present disclosure. The general operation of VSAT 300 is the same as the operation of VSAT 100. VSAT 300 includes a main reflector dish 302, a first feed 304, and a second feed 306. Instead of a single feed horn antenna coupled to both the uplink signal and the downlink signal, the first feed 304 and the second feed 306 each include a separate feed horn antenna. Signal 310 indicates an example signal path between main reflector dish 302 and first feed 304. Likewise, signal 312 indicates a signal path between main reflector dish 302 and second feed 306. In various embodiments, the first feed 304 may be connected to the uplink signal path and the second feed 306 may be connected to the downlink signal path. In other embodiments, the first feed 304 may be connected to the downlink signal path and the second feed 306 may be connected to the uplink signal path. In various embodiments, each feed may include a feed horn antenna designed to optimize its respectively assigned uplink signal path or the downlink signal path.

In various embodiments, separation of the uplink and downlink signals may be achieved using a frequency-selective surface module 308. The frequency-selective surface module 308 can include a support structure such as, for example, a block of material or a plate, and the support structure includes a frequency-selective surface on at least one face thereof. The frequency-selective surface in some embodiments includes periodic metallic patches designed to be transparent to a range of frequencies, but reflective to others. In operation, the in-band frequencies are capable of passing through the frequency-selective surface, without any effect on the in-band frequencies path of propagation, while the out-band frequencies are reflected off of the frequency-selective surface.

The frequency selective surface may be configured to transmit or reflect the RF signals based on their frequency. Accordingly, the frequency-selective surface may be configured to act as a filter, such as a pass-band filter. Which frequencies are capable of passing through the frequency-selective surface and which frequencies are reflected depends on the pattern of metallic or dielectric elements embodied on the frequency-selective surface. In other embodiments, the frequency selective surface can comprise a thin surface such as a metallic or dielectric screen or mesh.

As illustrated in the example of FIG. 3, a frequency-selective surface module 308 can be mounted so that it is positioned within the signal path between the main reflector dish 302 and the first feed 304 located at or near the focal point of the main reflector dish 302. For example, the first feed 304 may be located before or after the focal point of the main reflector dish, as long as the phase center of the feed horn of the first feed 304 is located at the focal point of the main reflector dish. In various embodiments, the frequency-selective surface module 308 may be configured to allow signal 310 to pass through the frequency-selective surface module 308 without materially altering the signal path or attenuating the signal 310. Additionally, the frequency-selective surface module 308 may be configured such that signal 312 is reflected off of the frequency selective surface to direct signal 312 between main reflector dish 302 and second feed 306.

For example, consider an embodiment in which the antenna is configured such that signal 310 is an uplink signal and signal 312 is a downlink signal. In this embodiment, uplink signal 310 emanates from first feed 304, is allowed to pass through frequency-selective surface module 308 and is reflected off main reflector dish 302 for transmission to the satellite. Also in this embodiment, downlink signal 312 from the satellite is reflected off main reflector dish 302 and subsequently reflected off the frequency-selective surface module 308 and directed toward second feed 306.

As another example, consider an embodiment in which the antenna is configured such that signal 310 is a downlink signal and signal 312 is an uplink signal. In this embodiment, uplink signal 312 emanates from second feed 306 is reflected off the frequency-selective surface module 308 and directed toward main reflector dish 302. Main reflector dish 302 directs the uplink signal 312 toward the satellite. Receive signal 310 is reflected by main reflector dish 302 toward first feed 304. Receive signal 310 is allowed to pass through frequency-selective surface module 308 without material attenuation or alteration of its path.

In various embodiments, the frequency-selective surface module 308 may be constructed using a non-conductive or dielectric base onto which conductive (e.g., metallic) elements are placed. In various embodiments, the conductive elements can be placed in a regular or periodic pattern that is dimensioned to allow one signal at a first frequency (e.g. signal 310) to pass through the frequency-selective surface module 308 without materially attenuating the signal or materially altering the signal path. The patterns can be implemented in various frequency-selective patterns such as, for example, strip gratings having a periodic array of conductive strips; resonant structures such as linear, convoluted and crossed dipoles; mesh or cross-mesh patterns; or other suitable patterns or arrangements. In other embodiments, rather than a patterned surface, three-dimensional structures such as, for example, photonic crystals may be used to provide a frequency selective material.

The conductive patterns can be disposed on a surface of the frequency-selective surface module 308 using any of a number of suitable patterning techniques including, for example, printing or screen printing with conductive inks, patterning conductive paints, photolithography processes, and so on. In various embodiments, the metallic traces may be made of conductive materials such as silver, copper, gold or other conductive elements or alloys. In some embodiments, the non-conductive base may be made using reinforced resins and epoxies (e.g. glass or fiberglass reinforced resins and epoxies such as FR-4), phenolics, plastics, glass, fiberglass and others. In yet another embodiment, selective surface module 308 can be fabricated using a sheet material such as a Mylar or Kapton sheet affixed to a solid surface or mounted in a frame, with the conductive materials patterned thereon. In some embodiments, the non-conductive base may be made of silicon, gallium arsenide, silicon dioxide, sapphire, aluminum oxide, or other non-metallic material suitable for use as the substrate of a printed-circuit board (PCB).

The frequency-selective surface module 308 acts as a subreflector for a signal to which the module is not transparent. For example, as illustrated in FIG. 3, the frequency-selective surface module 308 can be configured to allow the signal 310 to pass through the module, while signal 312 would reflect off the frequency-selective surface module 308. In this way, the frequency-selective surface module 308 separates the downlink signal 312 from the uplink signal 310 without the need for expensive and heavy waveguide devices. In various embodiments, the frequency-selective surface module 308 may be configured as having a flat surface, while in other embodiments the surface can have a contour such as, for example, a parabolic contoured surface.

In various embodiments, the mounting location of the frequency-selective surface module 308 may be adjustable, to allow for optimal placement of module 308 within the optical path of the main reflector dish 302. In some embodiments, the frequency-selective surface module 308 may be adjustable in the vertical direction, the horizontal direction, the angle at which it is mounted or some combination thereof. In this way, the frequency-selective surface module 308 may be positioned to optimally reflect one signal between main reflector dish 302 and the second feed 306 while still allowing the other signal to pass between the main reflector dish 302 and the first feed 304. In some embodiments, the frequency selective surface module 308 may include a notched support member such that the surface of the frequency-selective surface module 308 may be raised or lowered to ensure that the surface is within the propagation path of the main reflector dish. In some embodiments, the frequency-selective surface module may include a horizontal adjustment support designed to allow the surface of the frequency-selective surface module 308 to be adjusted in the horizontal direction. For example, horizontal adjustment may allow for optimal positioning of the second feed 306 by ensuring that the reflected focus of the frequency-selective surface 308 is at the position of the second feed 306.

In one embodiment, the frequency selective surface module 308 is transparent to (i.e., lets pass through) K-band and Ka-band signals and reflects Q-band signals. In such an implementation, the frequency selective surface module 308 may be considered "low-pass." In another embodiment, the frequency selective surface module 308 is transparent to Q-band signals and reflects K-band and Ka-band signals. In such an implementation, the frequency selective surface module 308 may be considered "high-pass."

In some embodiments, the first feed 304 and/or the second feed 306 may be configured as transceivers that transmit or receive signals within a certain frequency band (e.g., K-band, Ka-band, or Q-band). In such embodiments, the frequency surface module 308 may serve the purpose of a frequency multiplexer to separate (i.e., isolate) the various bands of signals such that the appropriate feed (e.g., feed 304 or feed 306) may transmit signals on the uplink and/or receive signals on the downlink in a given band.

By way of example, consider an embodiment in which the antenna is configured such that signal 310 may be an uplink signal transmitted by first feed 304 or a downlink signal received by first feed 304, and where signal 312 may be a downlink signal received by second feed 306. In this embodiment, uplink signal 310 emanates from first feed 304, passes through frequency-selective surface module 308, and is reflected off main reflector dish 302 for transmission to the satellite. Additionally, downlink signal 310 is reflected by main reflector dish 302 toward first feed 304 and passes through frequency-selective surface module 308 to first feed 304. Also in this embodiment, downlink signal 312 from the satellite is reflected off main reflector dish 302 and subsequently reflected off the frequency-selective surface module 308 and directed toward second feed 306.

Figure 4:
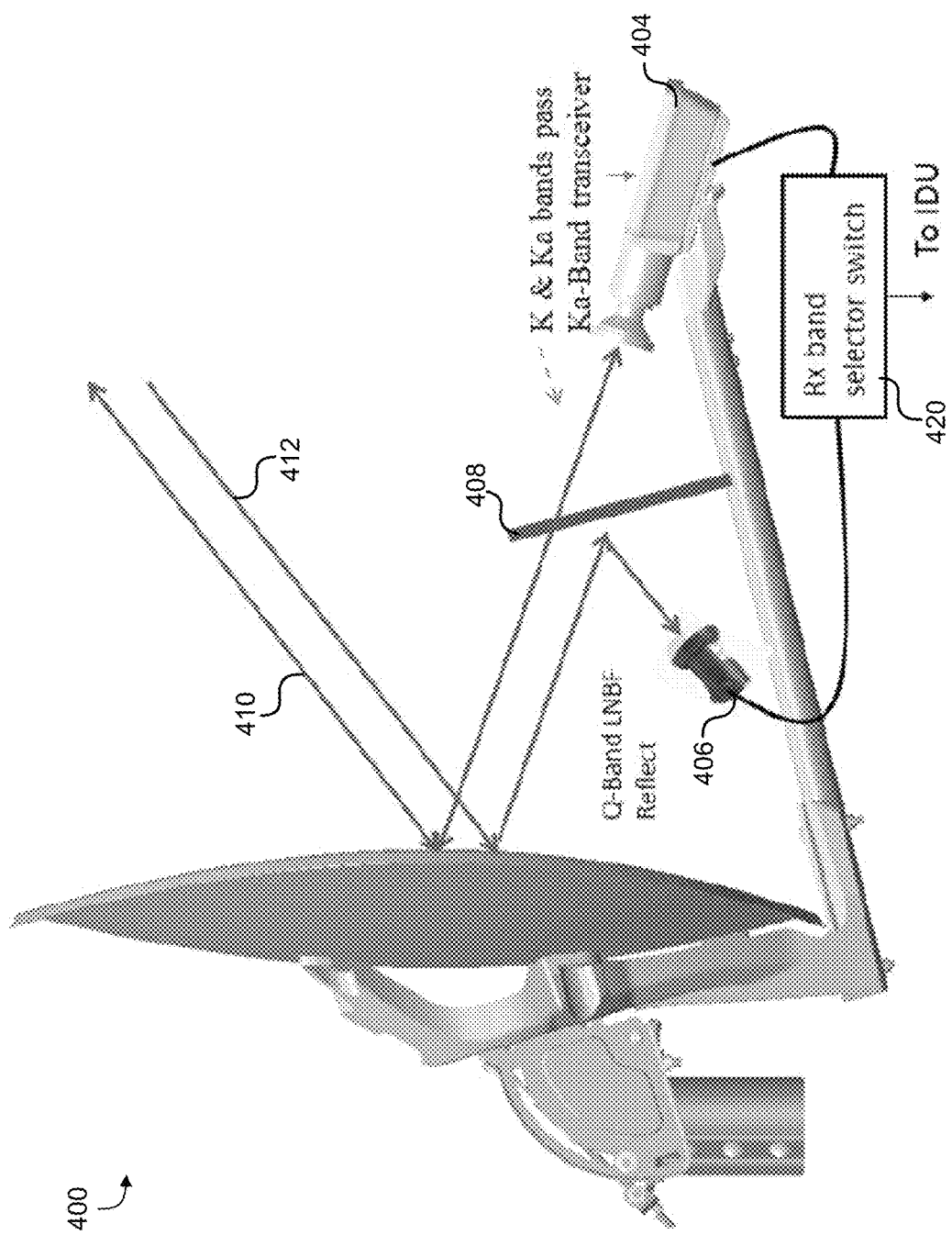
FIG. 4 illustrates an example implementation of a VSAT including a frequency-selective surface module that is transparent to K-band & Ka-band signals and reflective of Q-band signals.

FIG. 4 illustrates one particular example implementation of a VSAT 400 of this embodiment. As illustrated in this particular example, frequency-selective surface module 408 permits K-band & Ka-band signals 410 transmitted on the uplink or received on the downlink by Ka-band transceiver 404 to pass through. Frequency-selective surface module 408 reflects Q-band signals 412 received on the downlink by Q-band low-noise block feed (LNBF) 406. As such, in this example frequency-selective surface module 508 may be configured as a low-pass filter or a band-pass filter (e.g., band-pass filter for K-band and Ka-band). Also illustrated in the example of FIG. 4 is a receiver band selector switch 420 coupled to the output of LNBF 406 and a receiver output of transceiver 404. Switch 420 outputs to a satellite indoor unit (IDU) and allows switching between the respective frequency bands of LNBF 406 and transceiver 404.

By way of another example, consider an alternative embodiment in which the antenna is configured such that signal 312 may be an uplink signal transmitted by second feed 306 or a downlink signal received by second feed 306, and where signal 310 may be a downlink signal received by first feed 304. In this embodiment, uplink signal 312 emanates from second feed 306, is reflected off the frequency-selective surface module 308 and directed toward main reflector dish 302. Main reflector dish 302 directs the uplink signal 312 toward the satellite. Additionally, downlink signal 312 from the satellite is reflected off main reflector dish 302 and subsequently reflected off the frequency-selective surface module 308 and directed toward second feed 306. Also in this embodiment, downlink signal 310 from the satellite is reflected off main reflector dish 302 toward first feed 304 and passes through frequency-selective surface module 308.

Figure 5:
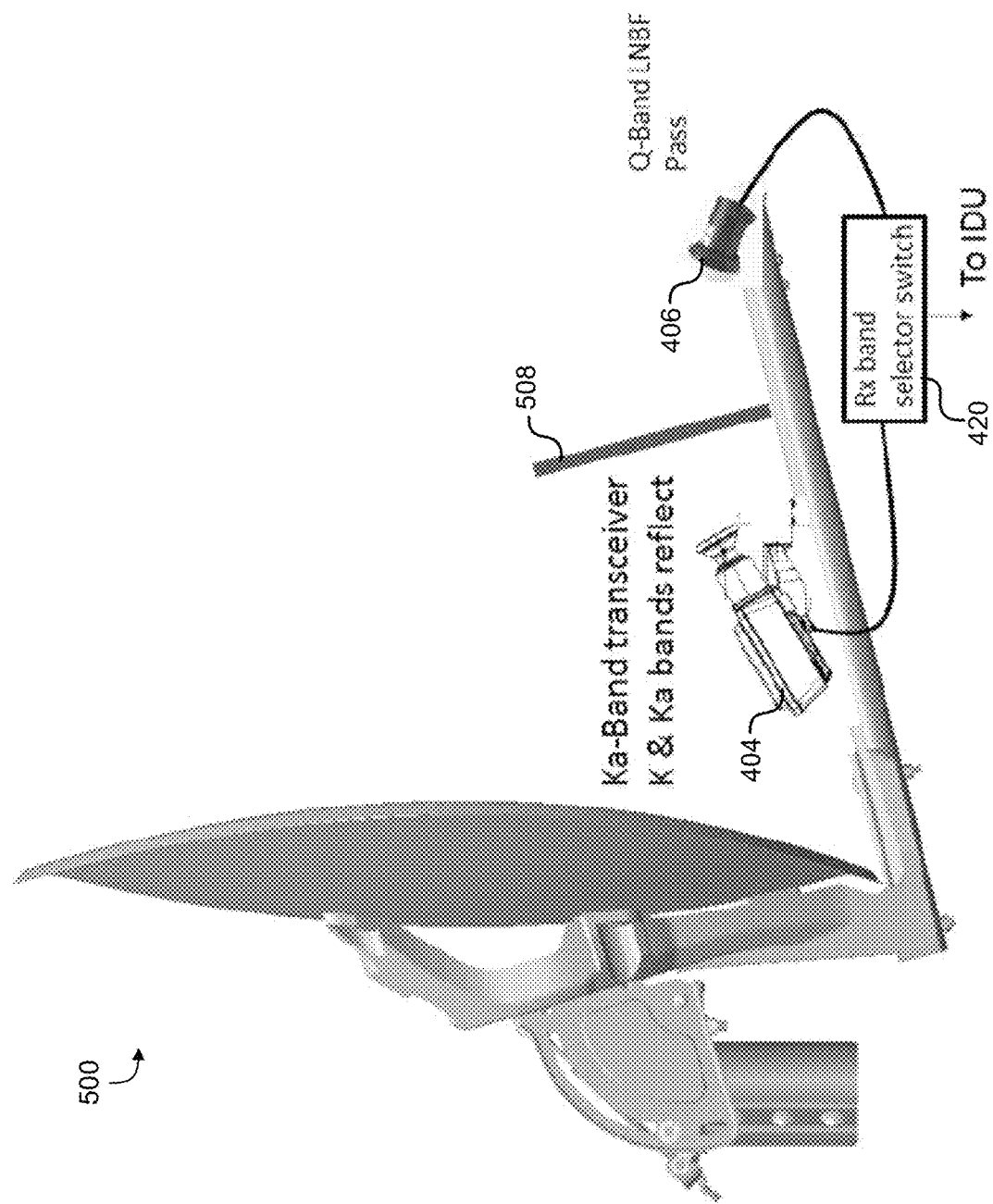
FIG. 5 illustrates an example implementation of a VSAT including a frequency-selective surface module that is transparent to Q-band signals and reflective of K-band & Ka-band signals.

FIG. 5 illustrates one particular implementation of a VSAT 500 of this example embodiment. In this particular example, frequency-selective surface module 508 permits Q-band signals received on the downlink by Q-band LNBF 406 to pass through. Frequency-selective surface module 408 reflects K-band and Ka-band signals received on the downlink or transmitted on the uplink by transceiver 404. As such, in this example frequency-selective surface module 508 may be configured as a high-pass filter or band-pass filter (e.g., band-pass filter for Q-band). Also illustrated in the example of FIG. 5 is a receiver band selector switch 420 coupled to the output of LNBF 406 and a receiver output of transceiver 404. Switch 420 outputs to a satellite indoor unit (IDU) and allows switching between the respective frequency bands of LNBF 406 and transceiver 404.

Figure 6:
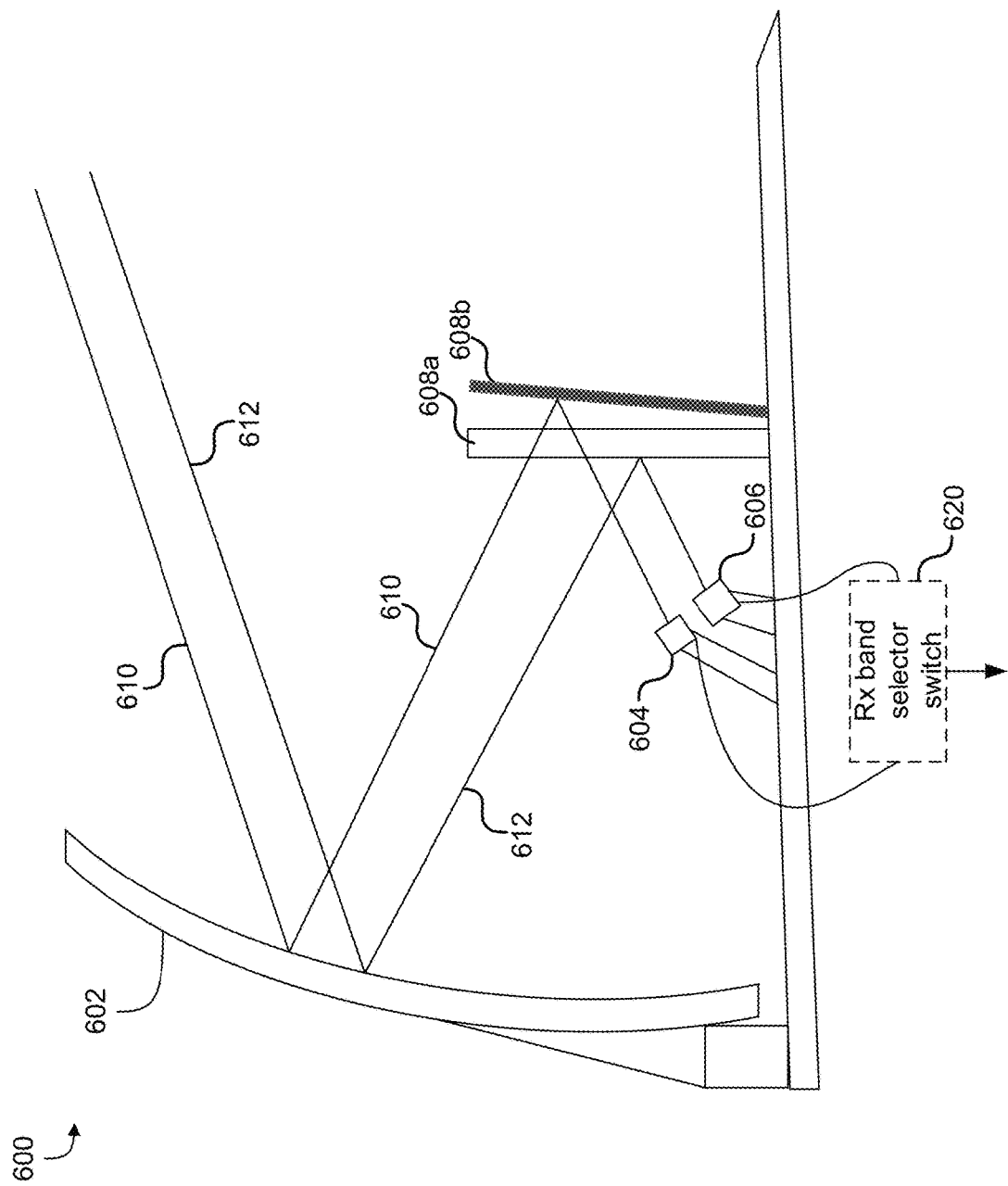
FIG. 6 illustrates an example VSAT implementing separate first and second feeds on the same side of a frequency-selective surface.

FIG. 6 illustrates another example VSAT 600 implementing separate first and second feeds in accordance with the present disclosure. VSAT 600 includes a main reflector dish 602, a first feed 604, a second feed 606, a frequency selective surface module or subreflector 608a, and a second subreflector 608b. In this example implementation, signal 610 illustrates an example signal path between first feed 604 and main reflector dish 602. Similarly, signal 612 illustrates an example signal path between second feed 606 and main reflector dish 602. In contrast to the example VSAT 300 of FIG. 3, the example VSAT 600 of FIG. 6 physically locates feeds 604 and 606 on the same side of frequency selective surface module or subreflector 608a. As feeds 604 and 606 are on the same side of subreflector 608a, they may be physically integrated into a single unit. Alternatively, feeds 604 and 606 may be implemented as two separate units in a modular fashion.

In implementations, further described below, each of feeds 604 and 606 may be implemented as a transmitter, a receiver, or a transceiver. In implementations where feeds 604 and 606 receive signals of different frequency bands, a receiver band selector switch 620 may be communicatively coupled to the outputs of each of feeds 604 and 606, and may be configured to switch between frequency bands depending upon which feed is receiving signals. In such implementations, the output of switch 620 may couple to a satellite indoor unit.

The example arrangement of VSAT 600 uses two subreflectors, a first subreflector 608a and a second subreflector 608b. First feed 604 is located at a reflected focus of second subreflector 608b and second feed 606 is located at a reflected focus of first subreflector 608a. First subreflector 608a is made of a frequency selective surface, as described above, that is transparent to signals of a first frequency band (e.g., signals transmitted or received by first feed 604) and is reflective to signals of a second frequency band (e.g., signals transmitted or received by second feed 606). Second subreflector 608b reflects signals that pass through first subreflector 608a (e.g., signals of transmitted or received by first feed 604). In some implementations, second subreflector 608b may be made of a solid metal that reflects signals of all frequencies. In other implementations, second subreflector 608b may be made of a second frequency selective surface that is reflective to signals of a first frequency band (e.g., signals transmitted by first feed 604), but may be transparent to signals of other frequency bands. Second subreflector 608b may be flat or it may be curved.

In example VSAT 600, first subreflector 608a and second subreflector 608b are located within an optical path between reflector 602 and a prime focus of the main reflector 602. Second subreflector 608b is located behind first subreflector 608a, further away from main reflector 602. Additionally, one of the subreflectors is tilted or angled relative to the other (i.e., they are not parallel). This tilting of subreflectors 608a and 608b accounts for the single prime focus of reflector 602, which would otherwise cause signals 610 and 612 to converge on or emanate from the same focal point and prevent dual feeds 604 and 606. In some implementations, first subreflector 608a may be angled such that it is located at the prime focus of main reflector 602. In implementations, main reflector 602 may be a prime focus dish or an offset dish.

Figure 7:
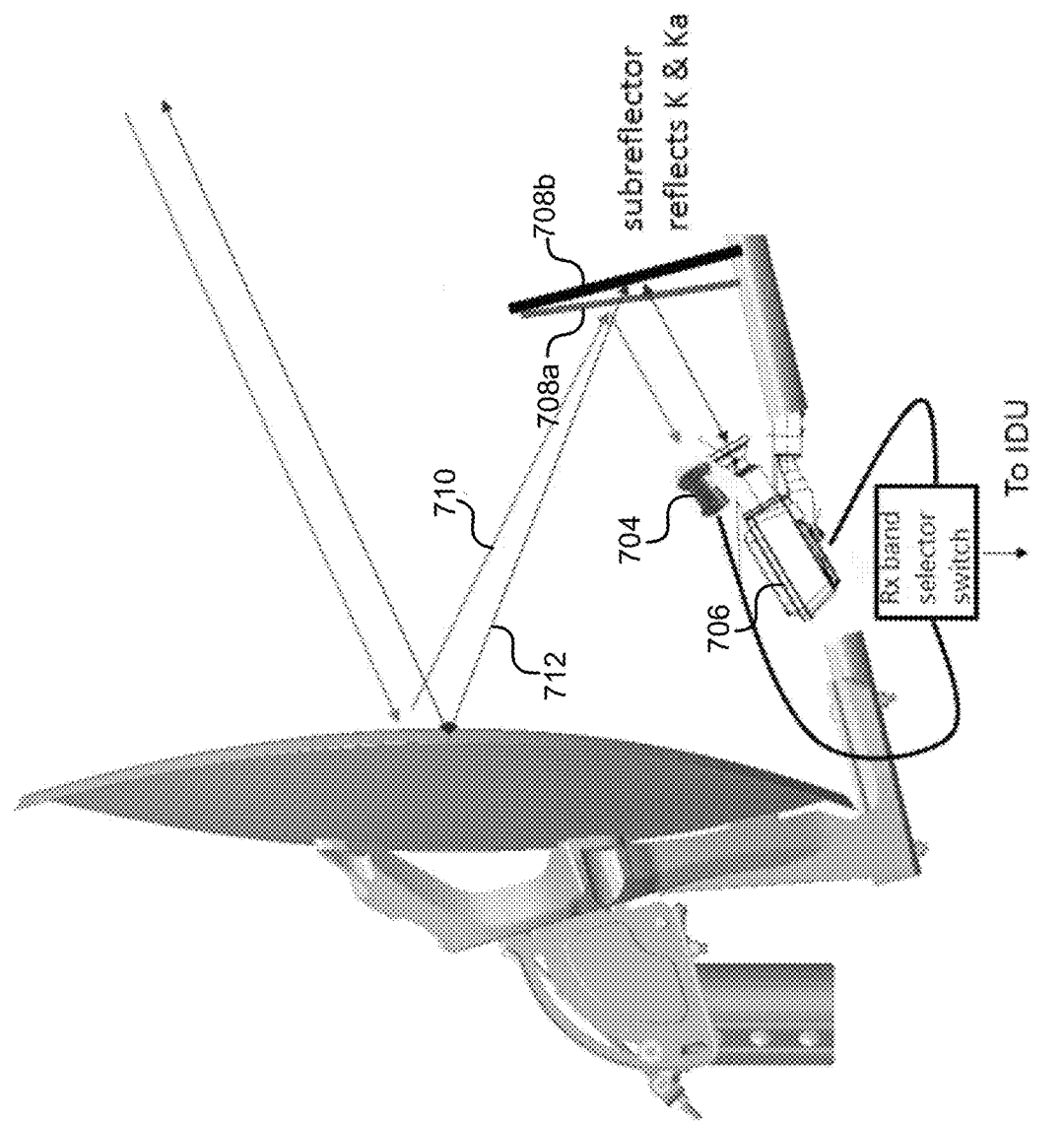
FIG. 7 illustrates one particular example implementation of a VSAT implementing dual feeds on a same side of subreflectors

FIG. 7 illustrates one particular example implementation of a VSAT implementing dual feeds on a same side of subreflectors. First subreflector 708a is made of a frequency selective surface and subreflector 708b is made of a solid metal that reflects signals of all frequencies. In this implementation, frequency selective surface subreflector 708a is transparent to K-band & Ka-band signals 712 received/transmitted by transceiver 706 and reflects Q-band signals 710 received by Q-band LNBF 704. The K-band and Ka-band signals 712 travel further than Q-band signals 710 until they hit the solid metal subreflector 708b, upon which they reflect. As previously noted, subreflector 708b can be either flat (as illustrated) or curved.

Figure 8:
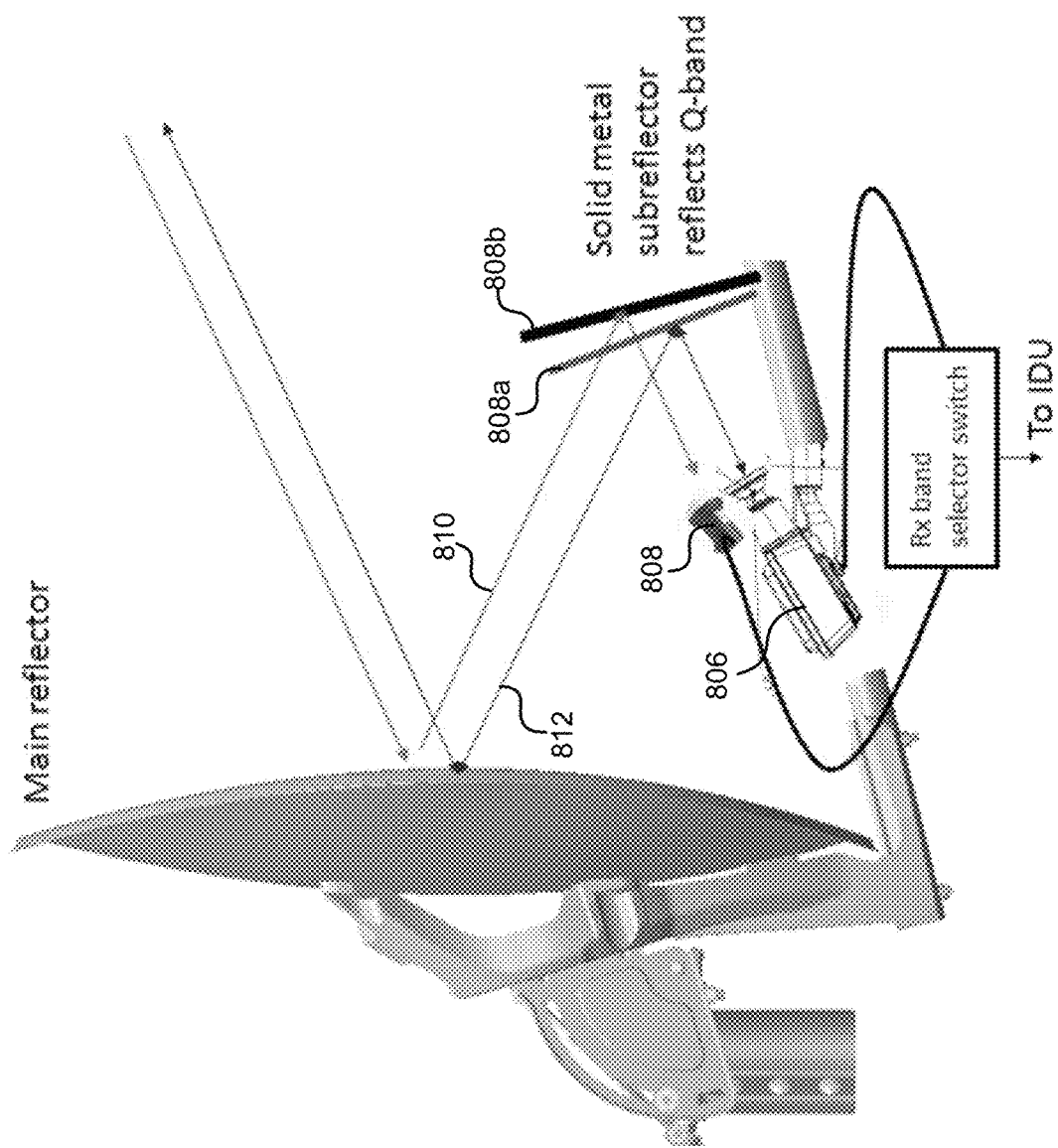
FIG. 8 illustrates another particular example implementation of a VSAT implementing dual feeds and on a same side of subreflectors The figures are not intended to be exhaustive or to limit the invention to the precise form disclosed. It should be understood that the invention can be practiced with modification and alteration, and that the disclosed technology be limited only by the claims and the equivalents thereof.

FIG. 8 illustrates another particular example implementation of a VSAT implementing dual feeds and on a same side of subreflectors. First subreflector 808a is made of a frequency selective surface and subreflector 808b is made of a solid metal that reflects signals of all frequencies. In this implementation, frequency selective surface subreflector 808a is transparent to Q-band signals 810 received by Q-band LNBF 804 and reflects K-band & Ka-band signals 812 received/transmitted by transceiver 806. The Q-band signals 810 travel further than the K-band and Ka-band signals 812 until they hit the solid metal subreflector 808b, upon which they reflect.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A communication terminal for satellite communications, comprising:
    a main reflector;
    a first subreflector having a reflected focus, wherein the first subreflector is a frequency-selective subreflector that is transparent to signals transmitted on a first band of frequencies and reflective to signals transmitted on a second band of frequencies;
    a second subreflector having a reflected focus, wherein the second subreflector is reflective to signals transmitted on the first band of frequencies;
    a first feed located at a reflected focus of the first subreflector, wherein the first feed receives signals on the second band of frequencies;
    a second feed located at a reflected focus of the second subreflector, wherein the second feed receives signals on the first band of frequencies; and
    a receiver band selector switch communicatively coupled to outputs of the first feed and the second feed, wherein the receiver band selector switch outputs to a satellite indoor unit and allows switching between the first band of frequencies received by the second feed and the second band of frequencies received by the first feed, wherein the communication terminal is a ground satellite terminal.

2. The communication terminal of claim 1 wherein the first subreflector and the second subreflector are not parallel.

3. The communication terminal of claim 1, wherein at least one of the first feed and the second feed comprises a transceiver.

4. The communication terminal of claim 1, wherein:
    one of the first band of frequencies and the second band of frequencies comprises a Q-band of frequencies; and wherein
    one of the first band of frequencies and the second band of frequencies comprises a K-band of frequencies and a Ku-band of frequencies.

5. The communication terminal of claim 1, wherein the first feed and the second feed are physically integrated into one unit.

6. The communication terminal of claim 1, wherein the second subreflector is a solid metal reflector.

7. The communication terminal of claim 1, wherein the terminal is a very small aperture terminal (VSAT).

8. The communication terminal of claim 2, wherein the main reflector is a prime focus dish, wherein the first subreflector is angled such that it is located at a prime focus of the main reflector.

* * * * *